(12) United States Patent
Watarai et al.

(10) Patent No.: US 9,227,689 B2
(45) Date of Patent: Jan. 5, 2016

(54) BICYCLE SHIFT OPERATING DEVICE

(75) Inventors: Etsuyoshi Watarai, Osaka (JP); Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 1556 days.

(21) Appl. No.: 11/970,591

(22) Filed: Jan. 8, 2008

(65) Prior Publication Data
US 2009/0173182 A1    Jul. 9, 2009

(51) Int. Cl.
*B62M 25/04* (2006.01)
*B62K 23/06* (2006.01)

(52) U.S. Cl.
CPC ............... *B62K 23/06* (2013.01); *B62M 25/04* (2013.01); *Y10T 74/20438* (2015.01)

(58) Field of Classification Search
USPC .......................... 74/502.2, 501.6, 489, 473.14
See application file for complete search history.

(56) References Cited

U.S. PATENT DOCUMENTS

| | | | |
|---|---|---|---|
| 4,532,825 A * | 8/1985 | Nagano | 74/532 |
| 4,864,885 A | 9/1989 | Nagano | |
| 5,012,692 A | 5/1991 | Nagano | |
| 5,052,241 A | 10/1991 | Nagano | |
| 5,186,072 A | 2/1993 | Nagano | |
| 5,222,412 A | 6/1993 | Nagano | |
| 5,241,878 A | 9/1993 | Nagano | |
| 5,287,766 A | 2/1994 | Nagano | |
| 5,325,735 A | 7/1994 | Nagano | |
| 5,400,675 A | 3/1995 | Nagano | |
| 5,676,022 A | 10/1997 | Ose | |
| 6,095,010 A * | 8/2000 | Arbeiter et al. | 74/473.14 |
| 6,647,823 B2 * | 11/2003 | Tsumiyama et al. | 74/501.6 |
| 7,000,496 B2 * | 2/2006 | Wessel et al. | 74/502.2 |
| 7,194,928 B2 | 3/2007 | Kawakami | |
| 2005/0204854 A1 | 9/2005 | Mclaughlin et al. | |
| 2006/0070478 A1 | 4/2006 | Kawakami | |
| 2006/0070479 A1 | 4/2006 | Ose | |
| 2006/0272443 A1 | 12/2006 | Tsumiyama | |

FOREIGN PATENT DOCUMENTS

| | | |
|---|---|---|
| EP | 0 067 692 B1 | 4/1986 |
| EP | 0 768 234 B1 | 2/1999 |
| EP | 0 698 548 B1 | 4/1999 |
| EP | 0863 069 B1 | 4/2003 |
| EP | 0 940 334 B1 | 7/2004 |
| EP | 1 535 829 A2 | 6/2005 |
| EP | 1 024 079 B1 | 11/2005 |
| EP | 1 134 158 B1 | 2/2006 |
| EP | 1 577 209 B1 | 10/2006 |
| EP | 1 334 903 B1 | 11/2008 |
| WO | WO-2005/044656 A1 | 5/2005 |

* cited by examiner

*Primary Examiner* — Thomas Diaz
(74) *Attorney, Agent, or Firm* — Global IP Counselors (57) ABSTRACT

A bicycle shift operating device basically has a base member, a shift wire take-up element and a shifting unit. The shift wire take-up element is rotatably mounted with respect to the base member in first and second rotational directions about a pivot axis. The shifting unit is operatively coupled to the shift wire take-up element. The shifting unit includes first and second shift operating members. The first shift operating member is movably mounted with respect to the base member to selectively operate the shift wire take-up element in the first and second rotational directions. The second shift operating member is movably mounted with respect to the base member to release the shift wire take-up element for movement in the second rotational direction.

9 Claims, 12 Drawing Sheets

BICYCLE SHIFT OPERATING DEVICE

BACKGROUND OF THE INVENTION

1. Field of the Invention

This invention generally relates to a bicycle shift operating device. More specifically, the present invention relates to a bicycle shift operating device that includes a shifting unit with a first shift operating member that can be used for both winding and releasing a control wire and a second operating member that can be used for one of winding and releasing the control wire.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the bicycle transmission. Specifically, a bicycle transmission typically includes front and rear shift operating devices designed to operate front and rear derailleurs to move the derailleurs laterally over a plurality of sprockets. The sprockets are usually coupled to the front crank and the rear wheel such that a pedaling force from the ride is transferred to the rear wheel via the chain.

In the past, shift operating devices have been utilized that include one or more levers that are pivoted to wind and release an inner wire of a control cable. Alternatively, rotating hand grips have also been utilized to wind and release the inner wire of the control cable. The wires are coupled to the front and rear derailleurs to shift the chain over the various sprockets. Some of these prior shift operating devices can be complicated and expensive to manufacture and assemble. Furthermore, some of these prior shifting devices are sometimes heavy and/or cumbersome.

In view of the above, there exists a need for a bicycle shift operating device which overcomes the above mentioned problems in the prior art. This invention addresses this need in the art as well as other needs, which will become apparent to those skilled in the art from this disclosure.

SUMMARY OF THE INVENTION

One object of the present invention is to provide a bicycle shift operating device that includes a first shift operating member that can be used for both winding and releasing a control wire and a second shift operating member that can be used for one of winding and releasing the control wire.

Another object of the present invention is to provide a bicycle shift operating device that is relatively simple and inexpensive to manufacture and assemble.

The foregoing objects can basically be attained by providing a bicycle shift operating device that basically includes a base member, a shift wire take-up element and a shifting unit. The shift wire take-up element is rotatably mounted with respect to the base member in first and second rotational directions about a pivot axis. The shifting unit is operatively coupled to the shift wire take-up element. The shifting unit includes a first shift operating member and a second shift operating member. The first shift operating member is movably mounted with respect to the base member to move along a first plane to operate the shift wire take-up element in the first rotational direction, and to move along a second plane to operate the shift wire take-up element in the second rotational direction, with the first and second planes being non-parallel so as to intersect with each other. The second shift operating member is movably mounted with respect to the base member to release the shift wire take-up element for movement in the second rotational direction.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
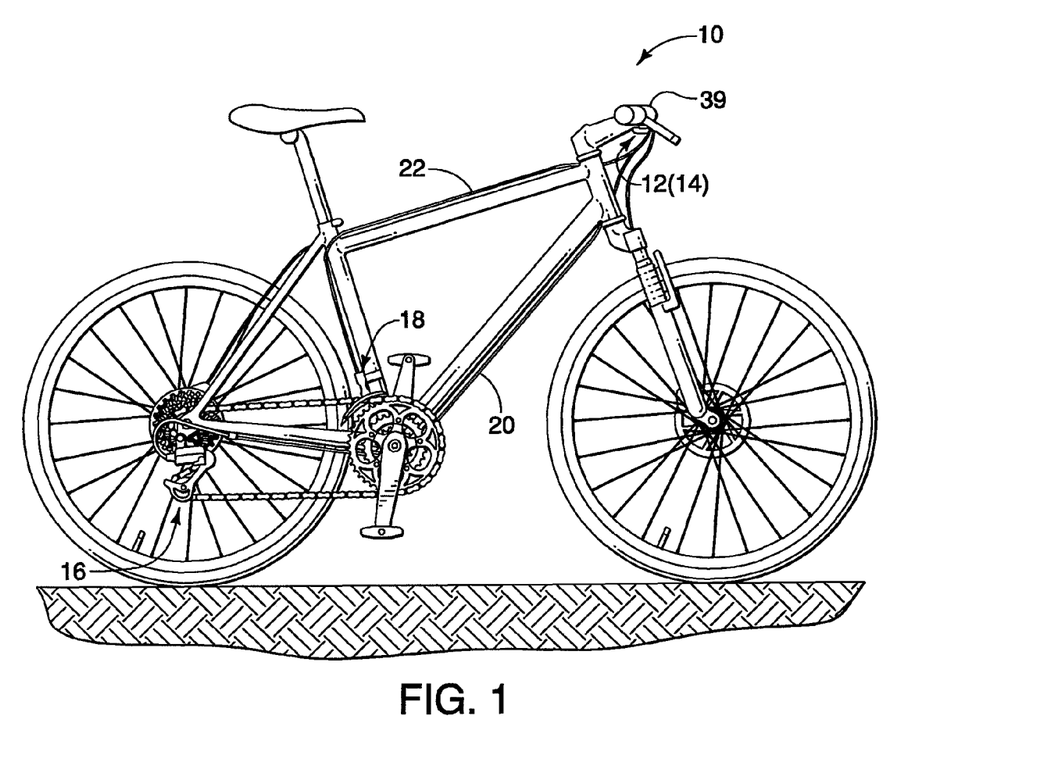
FIG. 1 is a side elevational view of a bicycle with a pair of shift operating devices coupled thereto in accordance with one embodiment.
Figure 2:
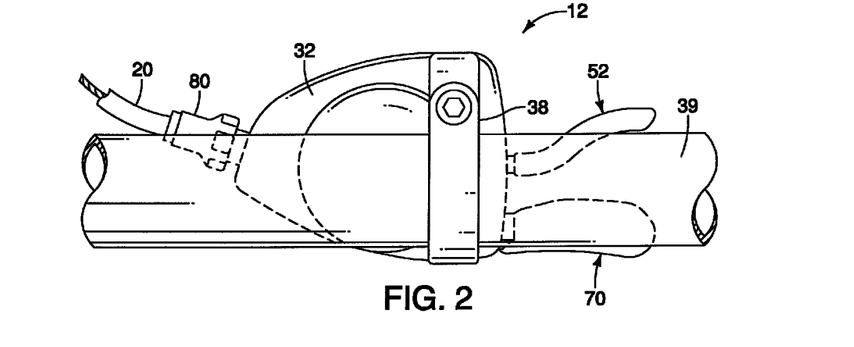
FIG. 2 is an enlarged top plan view of the right shift operating device in accordance with the illustrated embodiment, with first and second shift operating members in rest positions.
Figure 3:
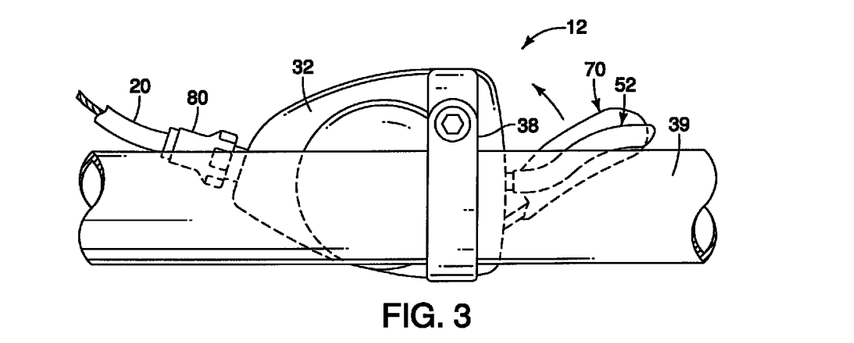
FIG. 3 is an enlarged top plan view of the right shift operating device illustrated in FIG. 2 in accordance with the illustrated embodiment, with the first shift operating member rotated to perform a first shifting (wire winding) operation.

Referring initially to FIG. 1, a bicycle 10 is illustrated that is equipped with a pair of bicycle shift operating devices 12 and 14 in accordance with a first embodiment. The bicycle shift operating device 12 is a right hand side control device operated by the rider's right hand to operate a rear derailleur 16, while the bicycle shift operating device 14 is a left hand side control device operated by the rider's left hand to operate a front derailleur 18. In the illustrated embodiment, the bicycle shift operating device 12 is operatively coupled to the rear derailleur 16 via a shift control cable 20. The bicycle shift operating device 14 is operatively coupled to the front derailleur 18 via a shift control cable 22. Preferably, the shift control cables 20 and 22 are conventional bicycle control cables that have an outer casing the covers an inner wire. In other words, each of the shift control cables 20 and 22 basically includes an inner wire slidably received within an outer casing. Alternatively, the bicycle control devices 12 and 14 can be switched so that the rider can operate the rear and front derailleurs 16 and 18 with opposite hands as needed and/or desired.

In the illustrated embodiment, the right and left hand bicycle shift operating devices 12 and 14 are essentially identical in operation, except that they are mirror images of each other and the number of shift positions are different. In other words, the left hand side shift operating device 14 is substantially identical to the right hand side shift operating device 12, except for the shifting unit (not shown) of the left hand side shift operating device 14 has been modified to be a mirror image and to decrease the number of gears that can be shifted. Thus, only the right hand side bicycle control device 12 will be discussed and illustrated herein.

Figure 4:
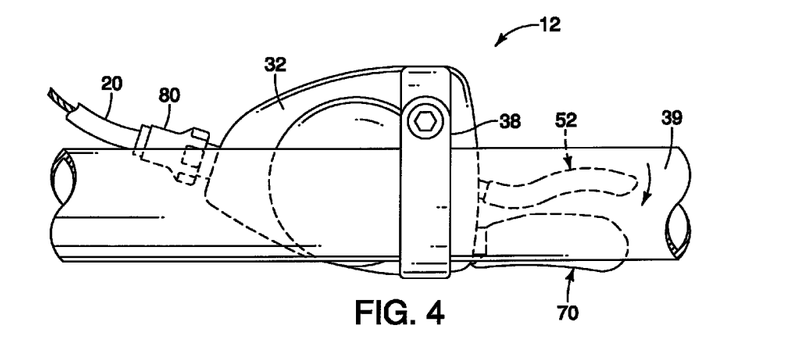
FIG. 4 is an enlarged top plan view of the right shift operating device illustrated in FIG. 2 in accordance with the illustrated embodiment, with the second shift operating member rotated to perform a second shifting (wire releasing) operation.
Figure 5:
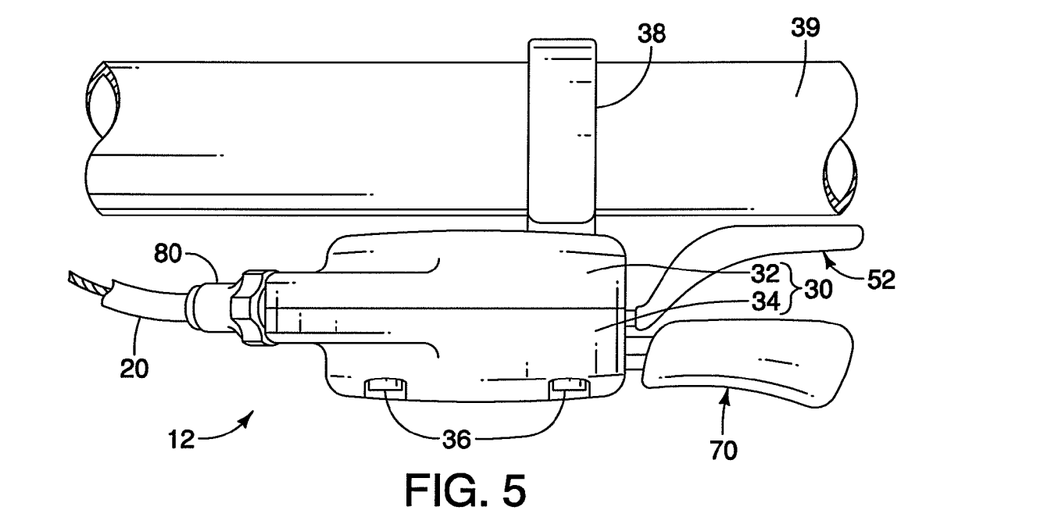
FIG. 5 is a rear elevational view of the right shift operating device illustrated in FIGS. 2 to 4 in accordance with the illustrated embodiment, with first and second shift operating members in rest positions.

As seen in FIGS. 4 and 5, the bicycle shift operating device 12 has a housing 30 with an upper cover 32 and a lower cover 34 that are coupled together by a plurality of screws 36 (only two shown in the Figures). The upper and lower covers 32 and 34 are constructed of a hard rigid material such as a hard plastic or a metallic material.

Figure 7:
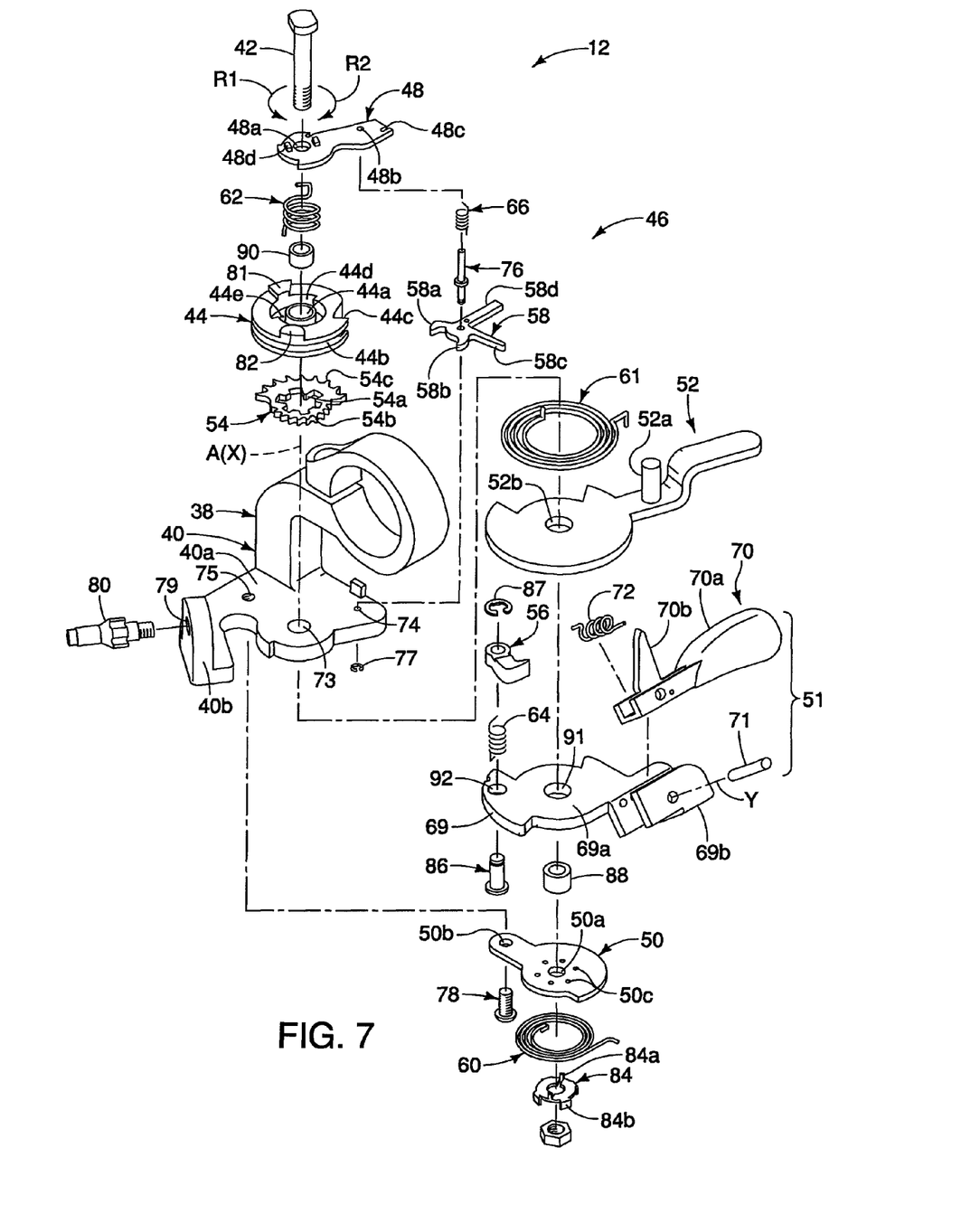
FIG. 7 is an exploded perspective view of selected parts of the right shift operating device illustrated in FIGS. 2 to 6 in accordance with the illustrated embodiment.

As seen in FIG. 7, inside of the housing 30 is a bicycle shifting mechanism is provided that basically includes a bicycle handlebar clamping member 38, a base member 40, a shift unit axle 42, a shift wire take-up element 44 and a shifting unit 46. The bicycle handlebar clamping member 38 is a conventional tube clamp that is configured to mount the bicycle shift operating device 12 on a bicycle handlebar 39 in a conventional manner. The clamping member 38 can be integrally formed with the base member 40, as illustrated, or can be a separate member that is attached to either the base member 40 or the housing 30 by a fastener, as needed and/or desired.

The shift unit axle 42 defines a main pivot axis A of the shift wire take-up element 44 and the shifting unit 46. The shifting unit 46 is operatively coupled to the shift wire take-up element 44 to selectively rotate the shift wire take-up element 44 in the first and second rotational directions R1 and R2 as explained below. The shift wire take-up element 44 and the shifting unit 46 are attached to the base member 40 by the shift unit axle 42 in conjunction with a first retaining plate 48 and a second retaining plate 50.

Figure 12:
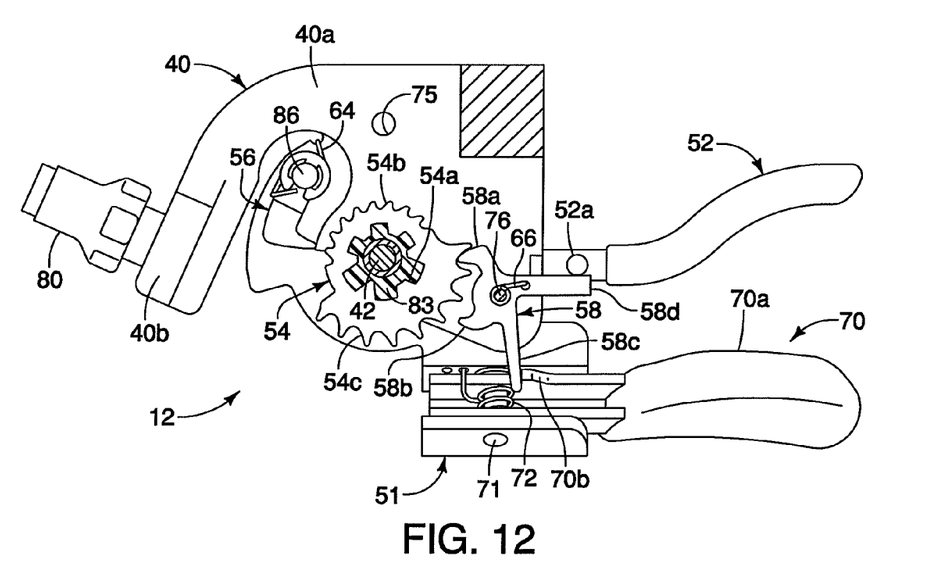
FIG. 12 is a cross sectional view of selected parts of the right shift operating device illustrated in FIGS. 2 to 11 to illustrated the shifting unit in the fully released position.
Figure 13:
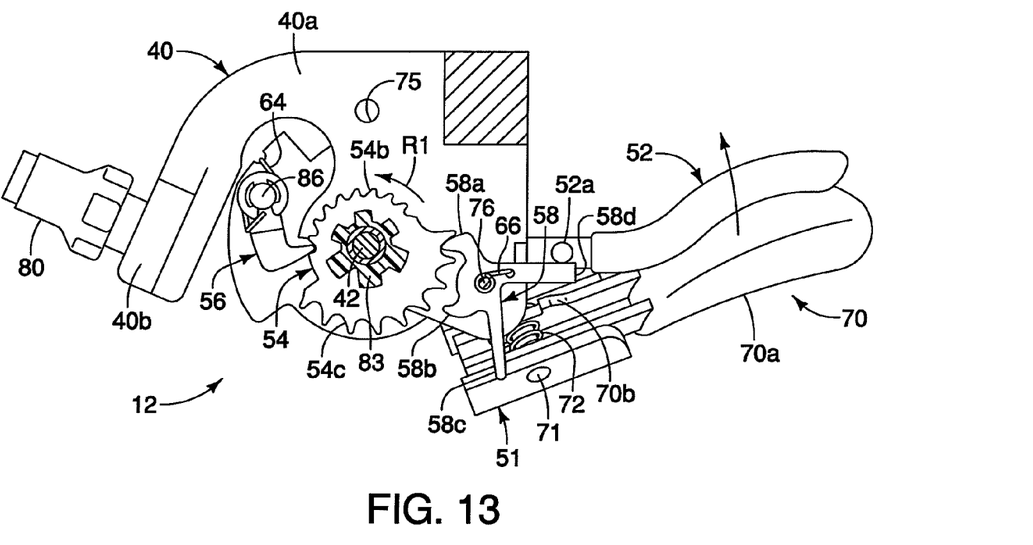
FIG. 13 is a cross sectional view, similar to FIG. 12, of the right shift operating device, but with the first shift operating member being initially moved so that the winding pawl engages one of the wire winding teeth to perform a shifting operation, i.e., a wire winding operation.
Figure 14:
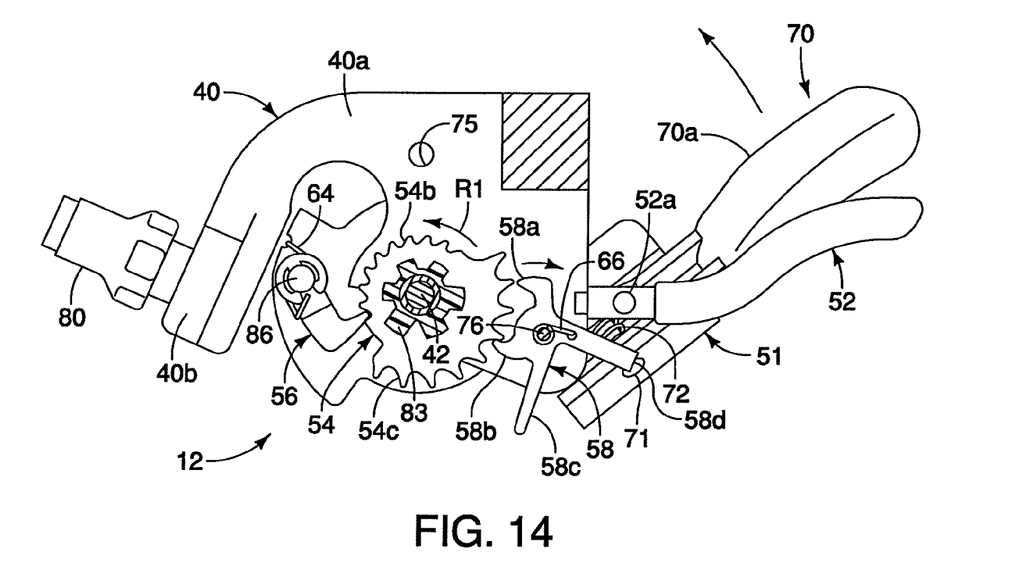
FIG. 14 is a cross sectional view, similar to FIGS. 12 and 13, of the right shift operating device, but with the first shift operating member rotating the ratchet member in the first rotational direction to perform the shifting operation, i.e., the wire winding operation.
Figure 15:
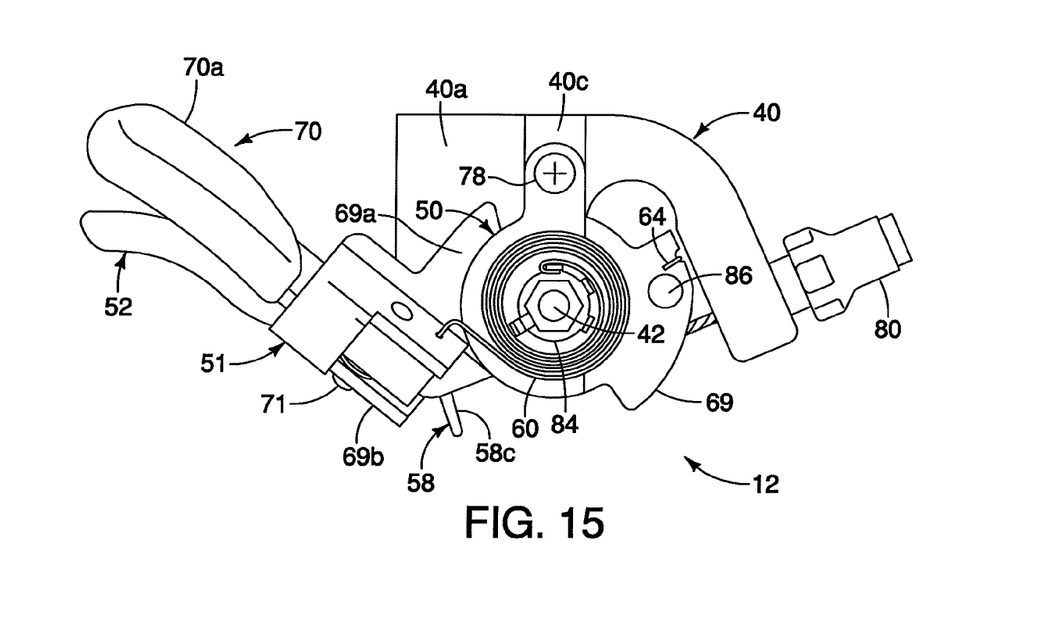
FIG. 15 is a bottom plan view of the right shift operating device illustrated in FIG. 14, with the first shift operating member rotating the ratchet member in the first rotational direction to perform the shifting operation, i.e., the wire winding operation.
Figure 16:
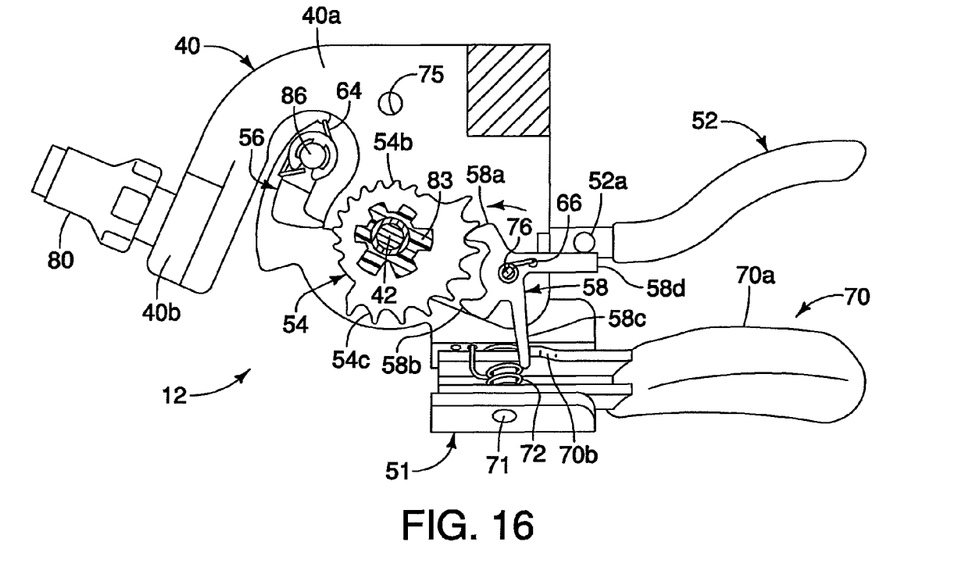
FIG. 16 is a cross sectional view, similar to FIGS. 12 to 14, of the right shift operating device, but with the first shift operating member returned to the rest position after the shifting operation, i.e., the wire releasing operation.
Figure 17:
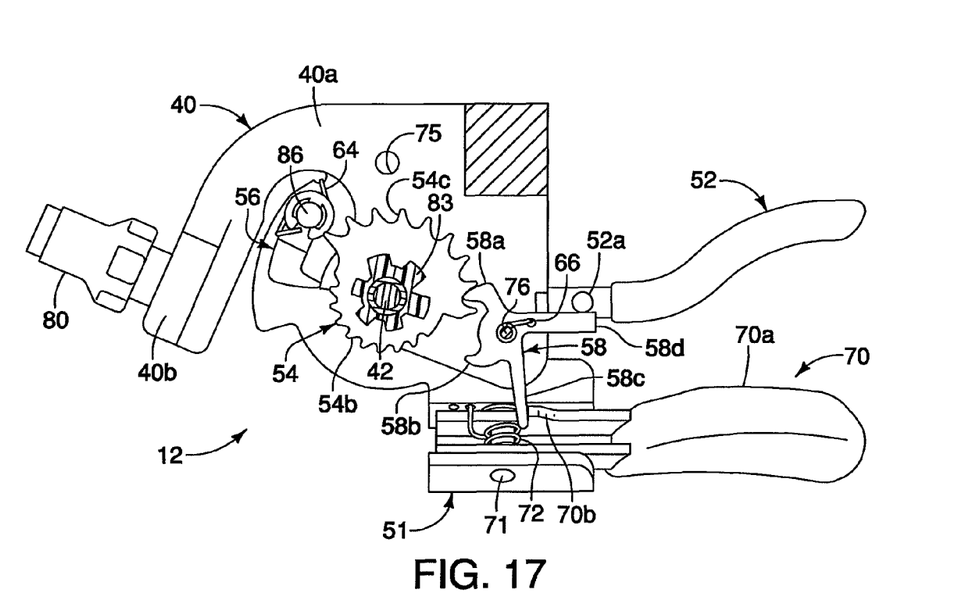
FIG. 17 is a cross sectional view of selected parts of the right shift operating device illustrated in FIGS. 2 to 16 to illustrated the shifting unit in the fully released position.
Figure 18:
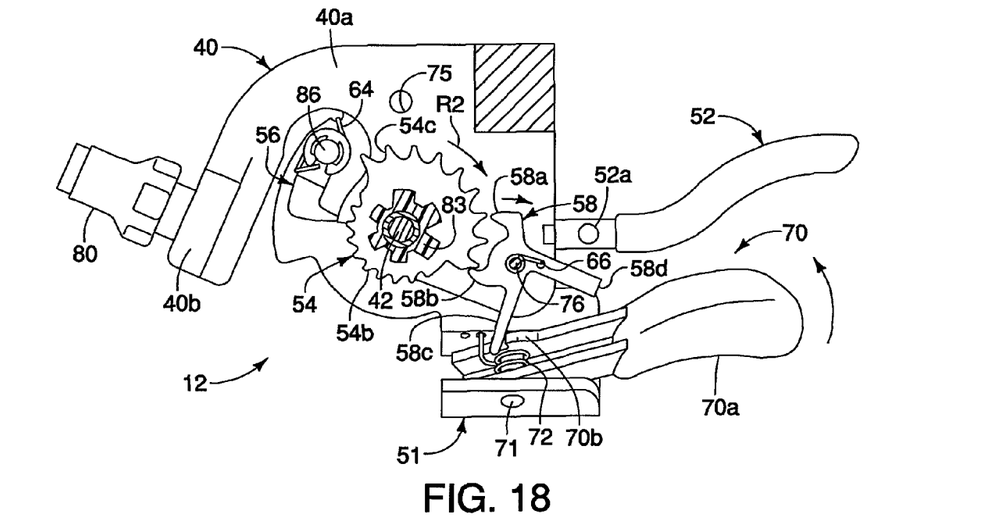
FIG. 18 is a cross sectional view, similar to FIG. 17, of the right shift operating device, but with the first shift operating member moved to a shifting position to perform a shifting operation, i.e., a wire releasing operation.

The shifting unit 46 basically includes a first shift operating member 51, a second shift operating member 52, a ratchet member 54, a winding pawl 56, and a release pawl 58. The shifting unit 46 further includes a first lever biasing element or return spring 60, a second lever biasing element or return spring 61, a main biasing element or spring 62, a winding pawl spring 64 and a release pawl spring 66. The return spring 60 is configured and arranged for urging the shift operating member 51 to a rest position so that the shift operating member 51 has a trigger action. The return spring 61 is configured and arranged for urging the shift operating member 52 to a rest position so that the shift operating member 52 has a trigger action. The main spring 62 is configured and arranged for urging both the shift wire take-up element 44 and the ratchet member 54 in a wire releasing direction. The winding pawl spring 64 is configured and arranged for urging the winding pawl 56 into engagement with the ratchet member 54 after the shift operating member 51 is moved in the first rotational direction R1 from a rest position to perform a shifting operation as seen in FIG. 13. The release pawl spring 66 is configured and arranged for urging the release pawl 58 into engagement with the ratchet member 54 when the shift operating members 51 and 52 are in the rest positions as seen in FIG. 12. Thus, the shifting unit 46 is operatively coupled to the shift wire take-up element 44 to control the position of the shift wire take-up element 44 in response to movement of the shift operating members 51 and 52.

The shift operating member 51 is a shift lever that is movably mounted with respect to the base member 40 to perform both wire winding and wire releasing operations of the shift wire take-up element 44. The shift operating member 51 is biased to a single prescribed rest position after performing a shifting operation (either a wire winding operation or a wire releasing operation). In particular, the return spring 60 biases the shift operating member 51 to the rest position with respect to the base member 40. The shift operating member 51 also has a support member 69 pivotally mounted on the shift unit axle 42, a lever member 70 pivotally mounted on the support member 69 by a pivot pin 71 and a biasing element or spring 72 urging the lever member 70 to a rest position with respect to the support member 69. Thus, the lever member 70 of the shift operating member 51 is also a trigger action lever that is biased to a single prescribed rest position after performing a shifting operation (e.g., a wire releasing operation).

The shift operating member 51 is pivotally mounted about the pivot axis A of the shift wire take-up element 44 to operate the shift wire take-up element 44 in the first rotational direction R1 in response to movement of the lever member 70 of the shift operating member 51 in a first plane P1. The lever member 70 of the shift operating member 51 is pivotally mounted on the pivot pin 71 to operate the shift wire take-up element 44 in the second rotational direction R2 in response to movement of the lever member 70 of the shift operating member 51 in a second plane P2. The first plane P1 is perpendicular to a primary operating axis X (coincident with the pivot axis A), while the second plane P2 perpendicular to a secondary operating axis Y defined by the pivot pin 71. Thus, rotating the lever member 70 about the primary operating axis X of the shift unit axle 42 performs a wire winding operation, while rotating the lever member 70 about the secondary operating axis Y of the pivot pin 71 performs a wire releasing operation.

Figure 11:
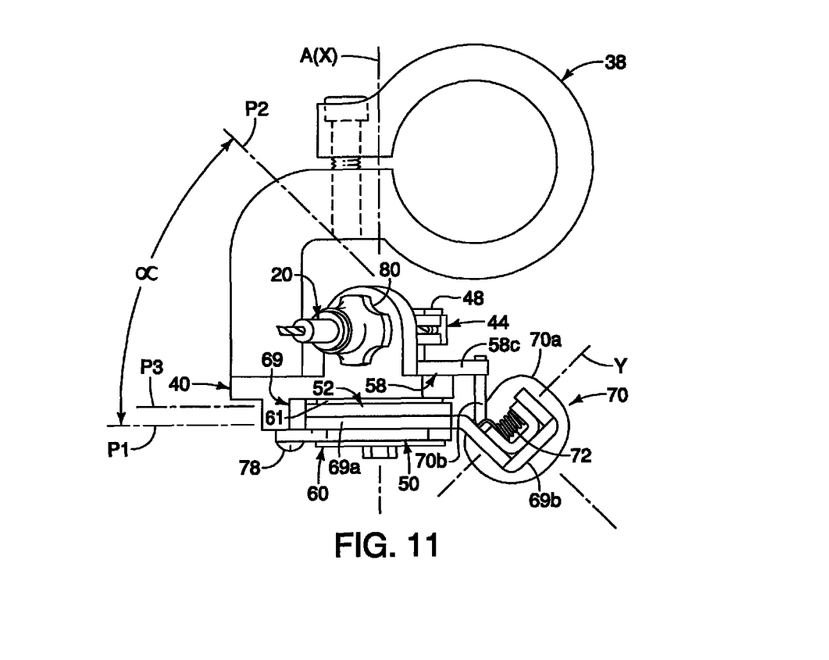
FIG. 11 is a side elevational view of the right shift operating device illustrated in FIGS. 2 to 10, but with the covers removed to illustrated the shifting unit.

In the illustrated embodiment, as best seen in FIG. 11, the first plane P1 forms an acute angle α with the second plane P2. Preferably, the angle α between the first and second planes P1 and P2 lies in a range between twenty degrees and seventy degrees. More preferably, the angle α is about forty-five degrees. In the illustrated embodiment, the angle α is forty-five degrees. Thus, the operating axis Y of the lever member 70 forms a forty-five degree angle with the operating axis X of the lever member 70. Since the lever member 70 pivots about the operating axes X and Y, the lever member 70 move along the first plane P1 to operate the shift wire take-up element 44 in the first rotational direction R1 and move along the second plane P2 to operate the shift wire take-up element 44 in the second rotational direction R2.

The shift operating member 52 is a shift lever that is movably mounted with respect to the base member 40 that only performs a wire releasing operation of the shift wire take-up element 44. The shift operating member 52 is biased to a single prescribed rest position after performing a shifting operation (a wire releasing operation). In particular, the return spring 61 biases the shift operating member 52 to the rest position with respect to the base member 40. In the illustrated embodiment, the shift operating member 52 has a pawl engagement projection or pin 52a for engaging the release pawl 58 to perform a shifting operation (a wire releasing operation) as discussed below. The shift operating member 52 has a main pivot hole 52b for receiving the shift unit axle 42 so that the shift unit axle 42 pivotally supports shift operating member 52.

Figure 6:
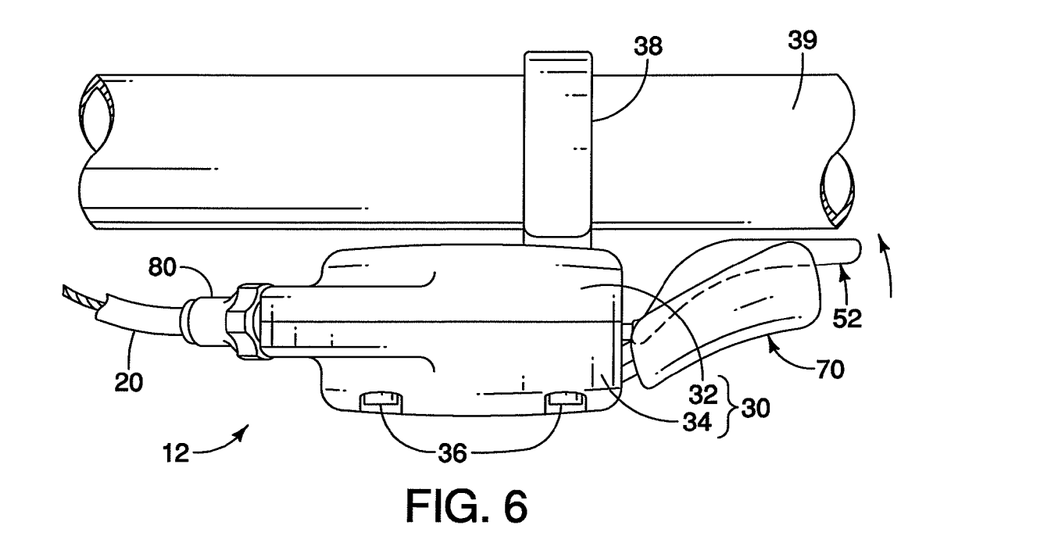
FIG. 6 is an enlarged top plan view of the right shift operating device illustrated in FIGS. 2 to 5 in accordance with the illustrated embodiment, with the first shift operating member rotated to perform the second shifting (wire releasing) operation.
Figure 9:
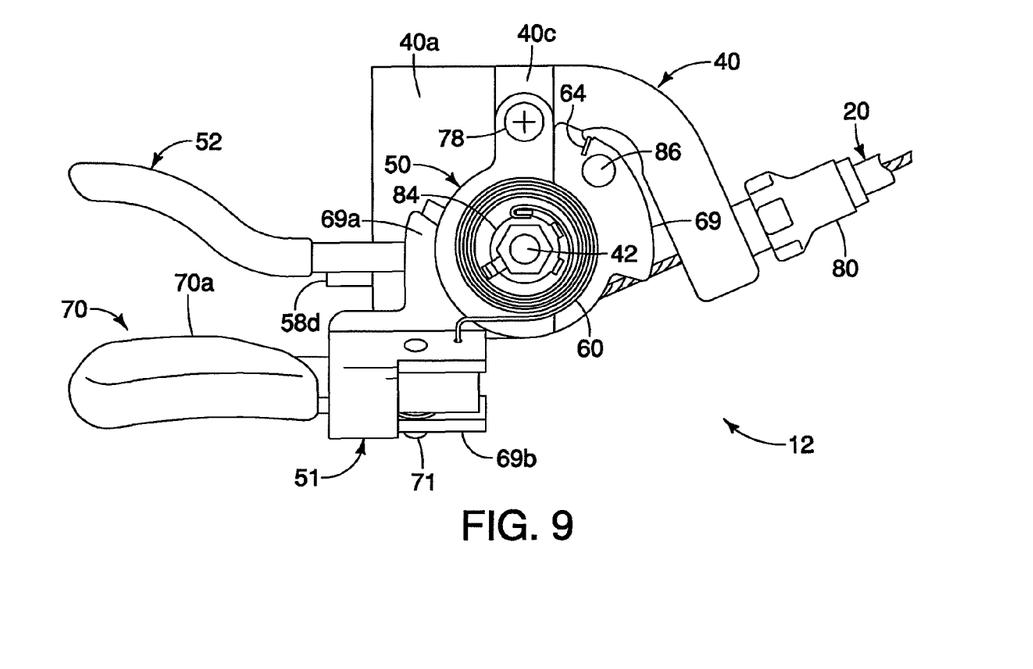
FIG. 9 is a bottom plan view of the right shift operating device illustrated in FIGS. 2 to 8, but with the covers removed to illustrated the shifting unit in a fully released (unwound) position.

As seen in FIG. 6, the base member 40 is preferably constructed of a hard rigid material such a metallic material. The base member 40 is the main support for the shift wire take-up element 44 and the shifting unit 46. Preferably, the base member 40 is constructed of a lightweight rigid material such as cast aluminum or deformed sheet metal. The base member 40 is located between the first retaining plate 48 and the second retaining plate 50. The base member 40 basically has a base portion 40a, a cable attachment flange 40b projecting upwardly from the upper side of the base portion 40a and a stop 40c (FIG. 9) projecting downwardly from the lower side of the base portion 40a.

As seen in FIG. 7, the base portion 40a of the base member 40 has a main axle hole 73, a release pawl supporting hole 74 and a threaded screw hole 75. The main axle hole 73 receives the shift unit axle 42 therethrough for operatively mounting the shift wire take-up element 44 on the upper side and for operatively mounting the shift operating members 51 and 52 on the lower side. The release pawl supporting hole 74 has a pivot pin 76 retained therein by a clip 77. The pivot pin 76 pivotally supports the release pawl 58. The threaded screw hole 75 threadedly receives a bolt 78 for fixing the second retaining plate 50 to the lower surface of the base member 40. The cable attachment flange 40b of the base member 40 has a threaded screw hole 79 for threadedly receiving a cable adjusting nut 80. The cable adjusting nut 80 receives the shift control cable 20. The stop 40c limits rotational movement of the shift operating member 52 about the shift unit axle 42. The threaded screw hole 75 extends through the stop 40c so that the second retaining plate 50 is spaced by a prescribed distance from the lower surface of the base member 40 to accommodate the shift operating members 51 and 52 between the second retaining plate 50 and the lower surface of the base member 40.

The winding pawl spring 64 is located on the lower side of the base portion 40a of the base member 40. The winding pawl spring 64 is pivotally supported on the shift operating member 51 by a pivot pin 86 that is retained on the shift operating member 51 by a clip 87 as seen in FIG. 7. The winding pawl spring 64 urges the winding pawl 56 into engagement with an abutment of the base portion 40a of the base member 40 when the shift operating member 51 is in a rest position as seen in FIG. 12.

In the illustrated embodiment, the shift unit axle 42 is formed by a bolt and a nut. The shift unit axle 42 rotatably supports the shift wire take-up element 44 on the upper side of the base member 40. In particular, the shift wire take-up element 44 is rotatably mounted with respect to the base member 40 in the first and second rotational directions R1 and R2 about a main pivot axis A. The shift unit axle 42 also pivotally supports the shift operating members 51 and 52 on the lower side of the base member 40 about the operating axis X. Thus, the shift unit axle 42 defines the main pivot axis A of the shift wire take-up element 44 and the operating axis X of the shift operating members 51 and 52. In other words, in the illustrated embodiment, the operating axis X of the operating members 51 and 52 is coincident with the pivot axis A of the shift wire take-up element 44.

The shift wire take-up element 44 is preferably a wire winding member that is integrally formed as a one-piece unitary member. Moreover, the shift wire take-up element 44 is preferably constructed of a lightweight rigid material such as hard plastic. The shift wire take-up element 44 basically has a central bore 44a, an inner wire receiving groove 44b and an inner wire nipple receiving recess 44c. The central bore 44a receives the shift unit axle 42 for rotatably supporting the shift wire take-up element 44. A tubular spacer 90 is disposed in the central bore 44a of the shift wire take-up element 44. The tubular spacer 90 is preferably a tubular member constructed of lightweight rigid material with one end contacting the lower surface of the first retaining plate 48 and the other end contacting the upper surface of the base member 40. The tubular spacer 90 maintains the appropriate spacing between the base member 40 and the first retaining plate 48 so that the shift wire take-up element 44 can freely rotate on the shift unit axle 42, i.e., so that the shift unit axle 42 does not apply an axial force on the shift wire take-up element 44. The inner wire nipple receiving recess 44c forms an attachment point for the shift control cable 20. As seen in FIG. 7, the upper surface of the shift wire take-up element 44 has an annular recess 44d for receiving a coiled portion of the main spring 62. A hole 44e is provided in the annular recess 44d for attaching one end of the main spring 62 thereto. In particular, the main spring 62 is preferably a metal torsion spring that is arranged to apply an urging force on the shift wire take-up element 44 and the ratchet member 54 to rotate about the shift unit axle 42 in the second rotational direction R2. The main spring 62 basically includes a first end engaged with a notch in the first retaining plate 48 (FIG. 8), a second end engaged with the shift wire take-up element 44 and a coiled portion located on the shift axle 42. The main spring 62 urges the shift wire take-up element 44 about the pivot axis A in the second rotational direction R2 so that the shift wire take-up element 44 automatically rotates in the wire releasing direction when a releasing operation is performed by pivoting the shift operating member 52 round the operating axis X or pivoting the lever member 70 of the shift operating member 51 round the operating axis Y.

Figure 8:
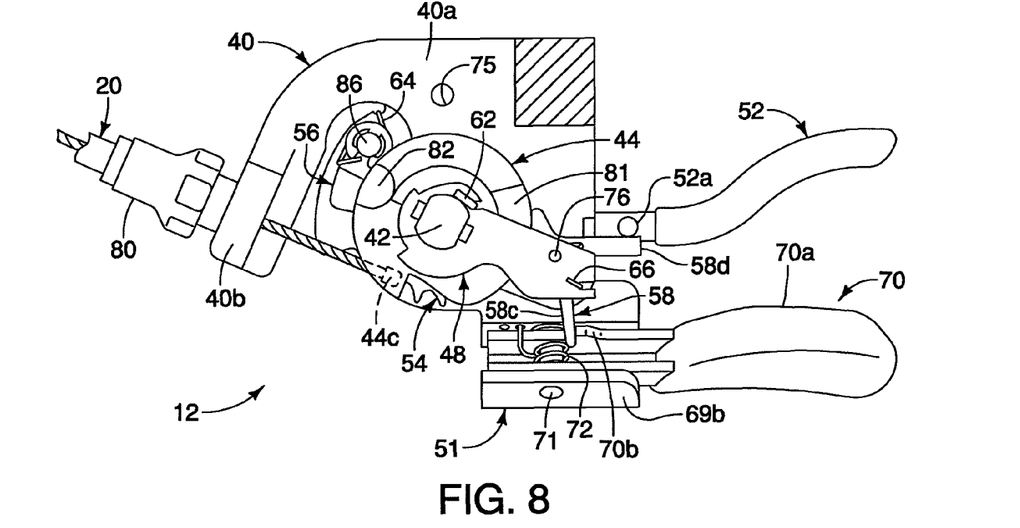
FIG. 8 is a top plan view of the right shift operating device illustrated in FIGS. 2 to 7, but with the covers removed to illustrated the shifting unit in a fully released position.
Figure 10:
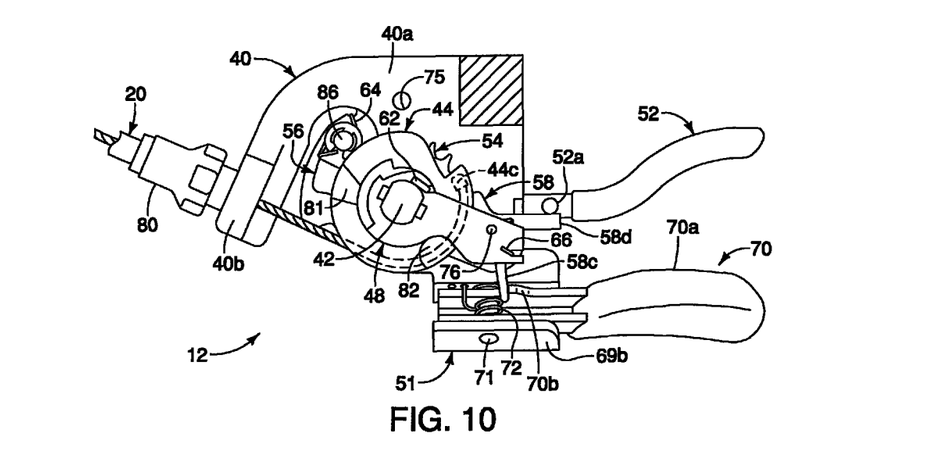
FIG. 10 is a top plan view of the right shift operating device illustrated in FIGS. 2 to 9, but with the covers removed to illustrated the shifting unit in a fully wound position.

As seen in FIGS. 8 and 10, the upper surface of the shift wire take-up element 44 has a first projection 81 and a second projection 82. These projections 81 and 82 act as end stops for the rotational movement of the shift wire take-up element 44. In particular, the first projection 81 will contact the first retaining plate 48 when the shift wire take-up element 44 is in a fully unwound position as seen in FIG. 8. On the other hand, the second projection 82 contacts the first retaining plate 48 when the shift wire take-up element 44 is in a fully wound position as seen in FIG. 10.

As best seen in FIGS. 12 to 23, the lower surface of the shift wire take-up element 44 has a non-circular projection 83 surrounding the central bore 44a. The non-circular projection 83 engages the ratchet member 54 to non-rotatably coupled to the ratchet member 54 to the shift wire take-up element 44. Thus, the ratchet member 54 rotates with the shift wire take-up element 44 as a unit. As explained below, the rotational movement of the shift wire take-up element 44 is controlled by the shifting unit 46.

As seen in FIG. 7, the first retaining plate 48 is preferably a plate member constructed of a hard rigid material such as a metallic material. The first retaining plate 48 has a first hole 48a for receiving the shift unit axle 42 and a second hole 48b for receiving the pivot pin 76 that pivotally supports the release pawl 58. A notch 48c is provided for receiving one end of the release pawl spring 66. Optionally, the upper surface of the first retaining plate 48 has a pair of projections 48d for engaging a head portion of the shift unit axle 42.

The second retaining plate 50 is preferably a plate member constructed of a hard rigid material such as a metallic material. The second retaining plate 50 has a first hole 50a for receiving the shift unit axle 42 and a second hole 50b for receiving the bolt 78 to fix the second retaining plate 50 to the lower side of the base member 40. The second retaining plate 50 also has a plurality of small retaining bores 50c located in a circular pattern about the first hole 50a. These small retaining bores 50c are configured to receive a pair of projections 84a of a nut plate 84 to selectively hold the nut plate 84 in one of a plurality of predetermined orientations, which depending upon which of the small retaining bores 50c receives the projections 48a of the nut plate 84. The nut plate 84 has a plurality of flanges 84b that project away from the second retaining plate 50 such that one of the flanges 84b receives one end of the return spring 60.

The shift operating member 51 is a trigger action lever that is biased to a single prescribed rest position by the return spring 60 after performing a shifting operation (i.e., either a wire winding operation or a wire releasing operation). The return spring 60 is preferably a spiral torsion spring with one end coupled to the shift operating member 51 and a second end coupled to the base member 40 (i.e., via the nut plate 84 and the second retaining plate 50 that is fixed to the base member 40 by bolt 78).

The support member 69 of the shift operating member 51 preferably includes a plate portion 69a and a bracket portion 69b. The plate portion 69a and the bracket portion 69b are preferably constructed as a one piece, unitary member from a hard rigid material such as a metallic material. The plate portion 69a has a main mounting hole 91 and a winding pawl supporting hole 92. The main mounting hole 91 receives the shift unit axle 42 therethrough for operatively mounting the shift operating member 51 thereto. Thus, the shift operating member 51 is pivotally mounted with respect to the base member 40 by the shift unit axle 42. The winding pawl supporting hole 92 has the pivot pin 86 retained therein by the clip 87 as seen in FIG. 6. The pivot pin 86 pivotally supports the winding pawl 56 on the shift operating member 51. The bracket portion 69b is a U-shaped member that pivotally supports the lever member 70.

A tubular spacer 88 is disposed in the main mounting opening 91 of the shift operating member 51 and the main pivot hole 52b of the shift operating member 52. The tubular spacer 88 is preferably a tubular member constructed of lightweight rigid material with one end contacting the lower surface of the base member 40 and the other end contacting upper surface of the second retaining plate 50. The tubular spacer 88 maintains the appropriate spacing between the base member 40 and the second retaining plate 50 so that the shift operating members 51 and 52 can be freely moved on the shift unit axle 42, i.e., so that the shift unit axle 42 does not apply an axial force on the shift operating members 51 and 52.

The support member 69 and the lever member 70 are urged to a rest position by the return spring 60. The plate portion 69a of the support member 69 forms the first plane P1. Thus, the operating member 51 can freely move along the first plane P1 to operate the shift wire take-up element 44 in the first rotational direction R1 in response to pivotal movement of the shift operating member 52 about the operating axis X. The lever member 70 is pivotally mounted on the bracket portion 69b of the support member 69 by the pivot pin 71. The spring 72 urges the lever member 70 to a rest position with respect to the support member 69. The lever member 70 has an external rider operating portion 70a and an internal pawl engagement projection 70b. The internal pawl engagement projection 70b is configured and arranged to engage the release pawl 58 so that the release pawl 58 is moved to release the ratchet member 54 as discussed below.

The ratchet member 54 is preferably a thin flat plate member. Preferably, the ratchet member 54 is constructed of a lightweight rigid material such as sheet metal. The ratchet member 54 basically includes a splined central opening 54a, a plurality of winding teeth 54b and a plurality of positioning teeth 54c. As seen FIGS. 11 to 19, the opening 54a is configured to receive the non-circular projection 83 of the shift wire take-up element 44 to non-rotatably couple the ratchet member 54 to the shift wire take-up element 44 in a predetermined orientation. Thus, the ratchet member 54 is mounted to rotate with the shift wire take-up element 44 in response to the pivotal movement of the shift operating members 51 and 52.

The winding teeth 54b are selectively engaged by the winding pawl 56 to rotate the shift wire take-up element 44 in the first rotational direction R1 in response to the pivotal movement of the shift operating member 51 about the operating axis X. The positioning teeth 54c are selectively engaged by the release pawl 58 to selectively hold and retain the ratchet member 54 and the shift wire take-up element 44 in one of the plurality of shift positions.

The winding pawl 56 is biased to engage the abutment of the base member 40 when the shift operating member 51 is in a rest position as seen in FIG. 12. In particular, the winding pawl spring 64 is preferably a metal torsion spring that is arranged to apply an urging force on the winding pawl 56 such that the winding pawl 56 is normally biased to engage one of the winding teeth 54b when the shift operating member 51 moves the winding pawl 56 off of the abutment of the base member 40. Thus, the winding pawl 56 is operatively coupled to the shift operating member 51 to selectively engage one of the winding teeth 54b of the ratchet member 54 to rotate the shift wire take-up element 44 in the first rotational direction R1 in response to the shift operating member 51 being moved along the first plane P1 from the rest position.

The release pawl 58 is operatively coupled to the shift operating member 51 to selectively engage one of the positioning teeth 54c of the ratchet member 54 to release the shift wire take-up element 44 in the second rotational direction in response to the shift operating member 51 being moved along the second plane P2. The release pawl 58 is biased to engage one of the positioning teeth 45c when the shift operating member 51 is in a rest position. In particular, the release pawl spring 66 is preferably a metal torsion spring that is arranged to apply an urging force on the release pawl 58 such that the release pawl 58 is normally biased to engage one of the positioning teeth 54c of the ratchet member 54 when the shift operating member 51 is in a rest position.

As seen in FIGS. 12 to 23, the release pawl 58 is pivotally mounted on the pivot pin 76, and basically includes a first stop tooth 58a, a second stop tooth 58b, a first actuating projection 58c and a second actuating projection 58d. The first and second stop teeth 58a and 58b are arranged to engage one of the positioning teeth 54c. In particular, as seen in FIGS. 17 to 20, when the lever member 70 of the shift operating member 51 is rotated upwardly about the operating axis Y, the pawl engagement projection 70b contacts actuating projection 58c of the release pawl 58 to rotate the release pawl 58 against the biasing force of the release pawl spring 66. This pivotal movement of the release pawl 58 causes the first stop tooth 58a to move out of engagement from the corresponding one of the positioning teeth 54c of the ratchet member 54 and the second stop tooth 58b to move into engagement with an adjacent one of the positioning teeth 54c. The shift wire take-up element 44 and the ratchet member 54 then rotate in the second rotational direction R2 by the main spring 62 until the second stop tooth 58b of the release pawl 58 catches one of the positioning teeth 54c of the ratchet member 54. In other words, the second stop tooth 58b move into engagement with an adjacent one of the positioning teeth 54c to limit rotation of the ratchet member 54 in the second rotational direction R2 so that the shift wire take-up element 44 and the ratchet member only rotate for one shift position under the biasing force of the main spring 62.

Figure 19:
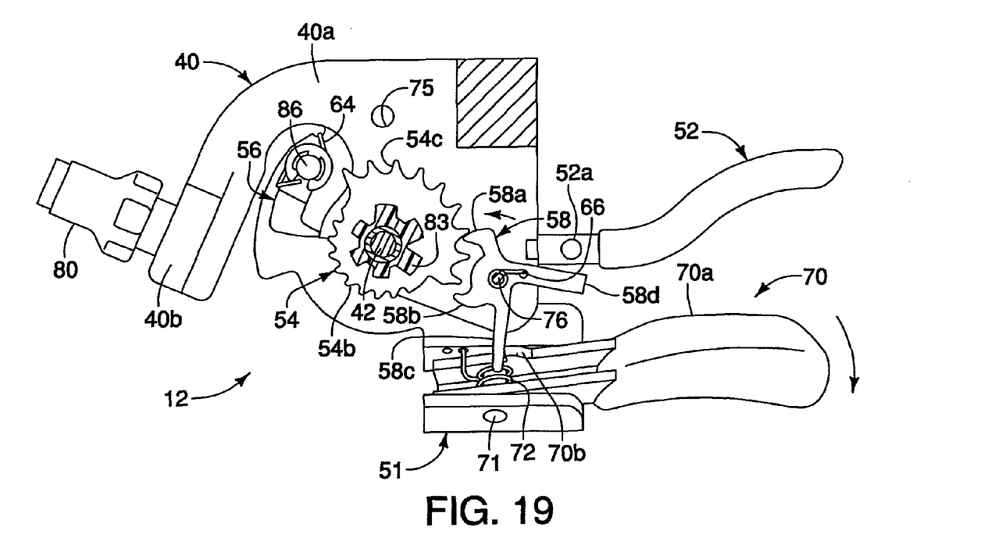
FIG. 19 is a cross sectional view, similar to FIGS. 17 and 18, of the right shift operating device, but with the first shift operating member returning to the rest position after the shifting operation, i.e., a wire releasing operation.
Figure 20:
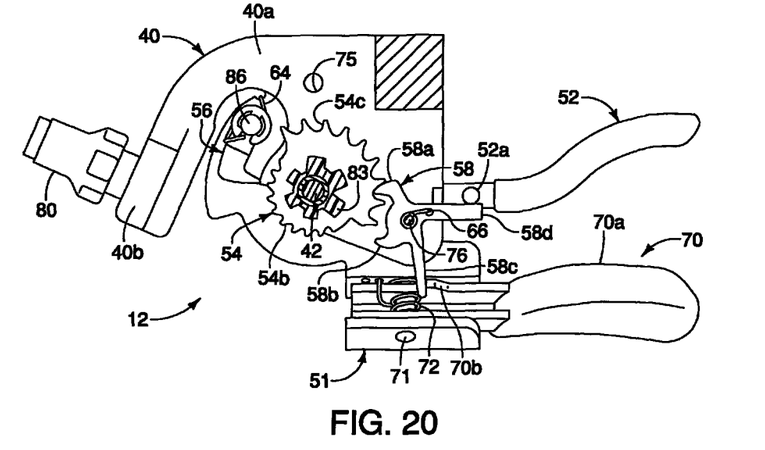
FIG. 20 is a cross sectional view, similar to FIGS. 17 to 19, of the right shift operating device, but with the first shift operating member returned to the rest position after the shifting operation, i.e., the wire releasing operation.

In this manner, the lever member 70 of the shift operating member 51 is movably mounted with respect to the base member 40 along the second plane P2 to operate the shift wire take-up element 44 in the second rotational direction R2 in response to pivotal movement of the lever member 70 of the shift operating member 51 with respect to the operating axis Y. In other words, the lever member 70 of the shift operating member 51 pivots upwardly from the rest position with respect to the base member 40 to perform a shifting (wire releasing) operation. The lever member 70 returns to its rest position under the urging force of the spring 72 as seen in FIGS. 19 and 20.

Figure 21:
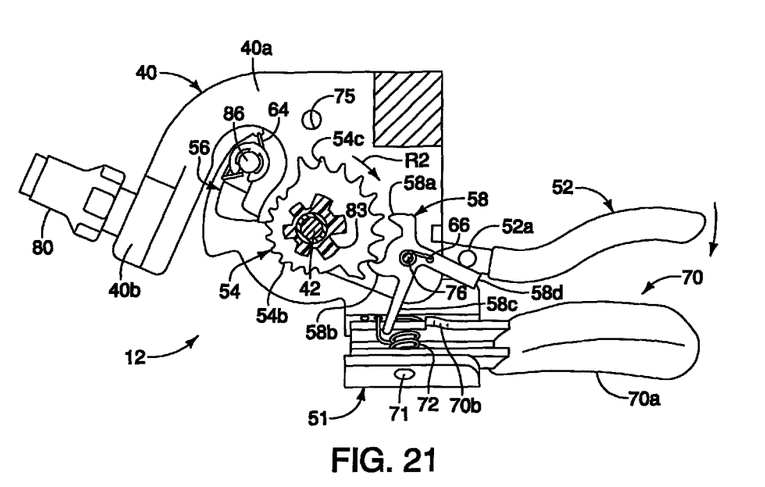
FIG. 21 is a cross sectional view, similar to FIG. 17, of the right shift operating device, but with the second shift operating member moved to a shifting position to perform a shifting operation, i.e., a wire releasing operation.
Figure 22:
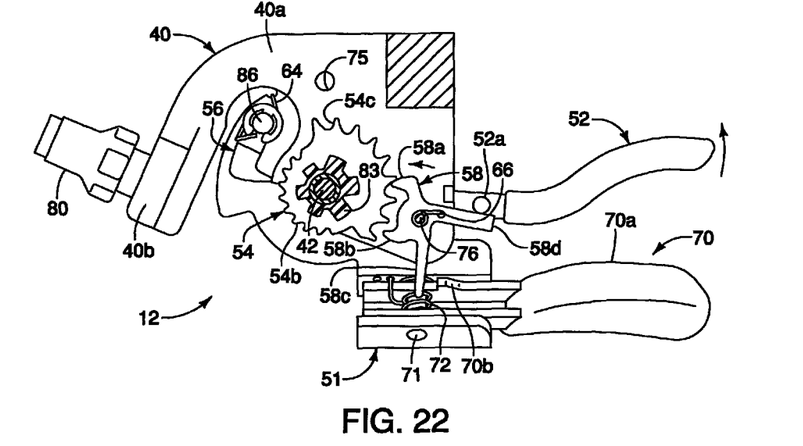
FIG. 22 is a cross sectional view, similar to FIG. 21, of the right shift operating device, but with the second shift operating member returning to the rest position after the shifting operation, i.e., the wire releasing operation.
Figure 23:
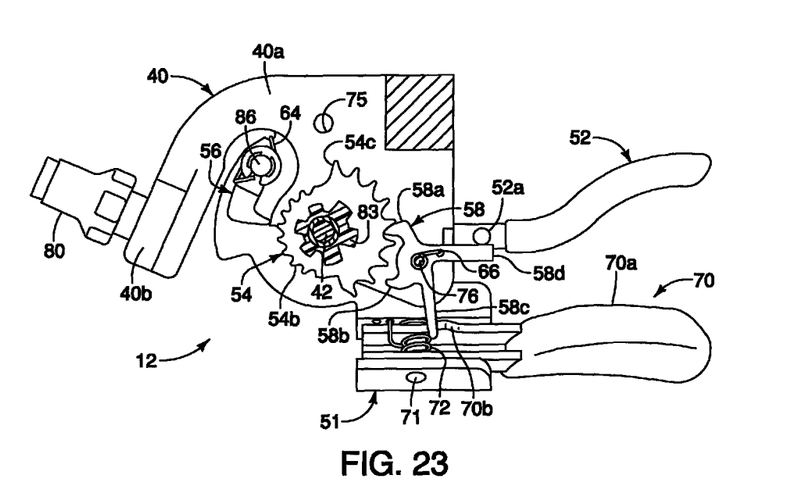
FIG. 23 is a cross sectional view, similar to FIGS. 21 and 22, of the right shift operating device, but with the second shift operating member returned to the rest position after the shifting operation, i.e., the wire releasing operation.

In a similar manner, as seen in FIGS. 21 to 23, when the shift operating member 52 is rotated about the operating axis X, a wire releasing operation is performed. In particular, rotation of the shift operating member 52 causes the pawl engagement projection or pin 52a contacts actuating projection 58d of the release pawl 58 to rotate the release pawl 58 against the biasing force of the release pawl spring 66. This pivotal movement of the release pawl 58 causes the first stop tooth 58a to move out of engagement from the corresponding one of the positioning teeth 54c of the ratchet member 54 and the second stop tooth 58b to move into engagement with an adjacent one of the positioning teeth 54c. The shift wire take-up element 44 and the ratchet member 54 then rotate in the second rotational direction R2 by the main spring 62 until the second stop tooth 58b of the release pawl 58 catches one of the positioning teeth 54c of the ratchet member 54. In other words, the second stop tooth 58b move into engagement with an adjacent one of the positioning teeth 54c to limit rotation of the ratchet member 54 in the second rotational direction R2 so that the shift wire take-up element 44 and the ratchet member only rotate for one shift position under the biasing force of the main spring 62.

In this manner, the shift operating member 52 is movably mounted with respect to the base member 40 along a third plane P3 to operate the shift wire take-up element 44 in the second rotational direction R2 in response to pivotal movement of the shift operating member 52 with respect to the operating axis X. The shift operating member 52 returns to its rest position under the urging force of the spring 61 as seen in FIG. 22.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift operating device comprising:
   a base member;
   a shift wire take-up element rotatably mounted with respect to the base member in first and second rotational directions about a pivot axis; and
   a shifting unit operatively coupled to the shift wire take-up element, the shifting unit including a first shift operating member and a second shift operating member,
   the first shift operating member being movably mounted with respect to the base member to move along a first plane in a first movement direction from a rest position to operate the shift wire take-up element in the first rotational direction, and to move along a second plane in a second movement direction from the rest position to operate the shift wire take-up element in the second rotational direction, with the first and second planes being non-parallel so as to intersect with each other,
   the second shift operating member being movably mounted with respect to the base member to move along a third plane in a third movement direction to release the shift wire take-up element for movement in the second rotational direction while the first shift operating member remains stationary, with the second plane and the third plane being non-parallel on as to intersect with each other.

2. The bicycle shift operating device according to claim 1, wherein
   the first and second shift operating members are pivotal mounted about a single operating axis.

3. The bicycle shift operating device according to claim 1, wherein
   the first shift operating member is pivotally mounted about the pivot axis of the shift wire take-up element to operate the shift wire take-up element in the first rotational direction.

4. The bicycle shift operating device according to claim 1, wherein
   the second shift operating member is pivotally mounted about the pivot axis of the shift wire take-up element to operate the shift wire take-up element in the second rotational direction.

5. The bicycle shift operating device according to claim 1, wherein
   the first shift operating member is pivotally mounted about a secondary operating axis to operate the shift wire take-up element in the second rotational direction.

6. The bicycle shift operating device according to claim 1, wherein
   the shifting unit further includes a biasing element urging the shift wire take-up element about the pivot axis in the second rotational direction.

7. The bicycle shift operating device according to claim 1, wherein
   each of the first and second shift operating members is a trigger action lever that is biased to the rest position which is a single prescribed rest position after performing a shifting operation.

8. The bicycle shift operating device according to claim 1, wherein
   the shifting unit further includes
      a ratchet member mounted to rotate with the shift wire take-up element in response to movements of the first and second shift operating members,
      a winding pawl operatively coupled to the first shift operating member to selectively engage the ratchet member to rotate the shift wire take-up element in the first rotational direction in response to the first shift operating member being moved along the first plane; and
      a release pawl operatively coupled to the first and second shift operating members to release the shift wire take-up element in the second rotational direction in response to the first shift operating member being moved along the second plane or the second shift operating member being moved.

9. The bicycle shift operating device according to claim 8, wherein
   the release pawl is biased to engage one of a plurality of positioning teeth of the ratchet member when the first and second shift operating members are in the rest position.

* * * * *